Oct. 12, 1937.  C. E. HATHORN  2,095,743
RETRACTABLE LANDING GEAR
Filed May 11, 1934
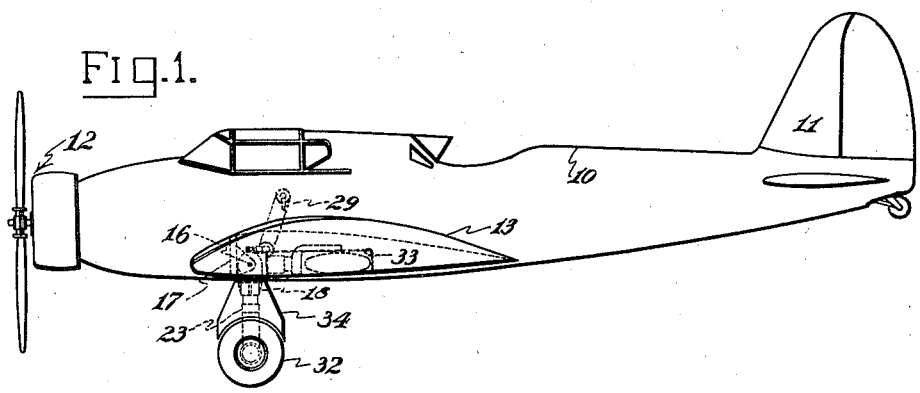
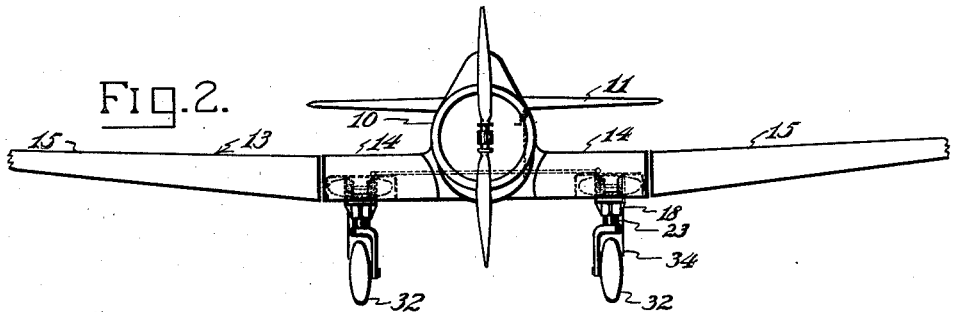
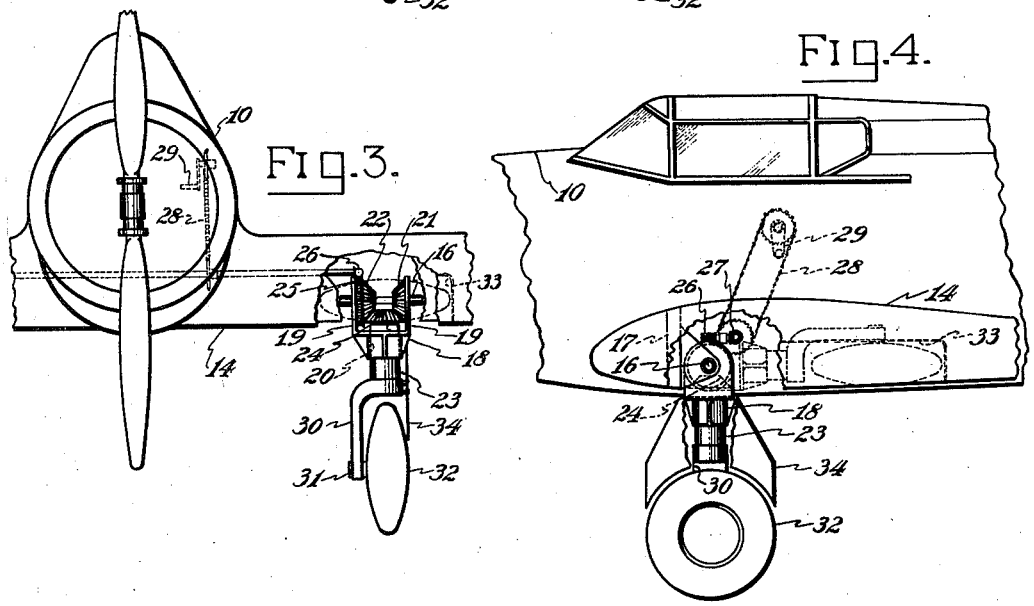
INVENTOR.
CHARLES E. HATHORN.
BY
ATTORNEYS.

Patented Oct. 12, 1937

2,095,743

UNITED STATES PATENT OFFICE 2,095,743

RETRACTABLE LANDING GEAR

Charles E. Hathorn, Kenmore, N. Y., assignor, by mesne assignments, to Curtiss-Wright Corporation, a corporation of New York Application May 11, 1934, Serial No. 725,137

3 Claims. (Cl. 244—102)

This invention relates to improvements in retractable landing gears for aircraft.

An object of the invention is to provide a simplified form of retractable landing gear particularly adapted for use in conjunction with a low wing type of airplane.

A further object is to provide means for extending a landing wheel below an aircraft, and for retracting the wheel upwardly within a suitable recess provided in the lower face of the craft.

Still another object is to provide mechanism for simultaneously retracting and turning the wheel, so that when retracted, the wheel lies in a horizontal plane within a suitable recess in the craft.

Still another object is to provide a landing gear wherein the wheel is movable in a fore and aft plane between retracted and extended positions, the retracted position providing for housing of the wheel within a portion of the aircraft so that no part thereof protrudes into the air stream.

Still another object is to provide a novel form of bevel gear mechanism for retracting and extending an aircraft landing gear.

Further objects will become apparent from a reading of the subjoined specification and claims, and from a consideration of the accompanying drawing, in which similar numbers indicate similar parts, and in which:

Fig. 1 is a side elevation of an aircraft embodying the landing gear of this invention;

Fig. 2 is a front elevation of the aircraft;

Fig. 3 is an enlarged front elevation partly broken away to show the landing gear mechanism; and Fig. 4 is an enlarged fragmentary side elevation partly broken away to show the landing gear mechanism.

For the purpose of illustration, I have shown a low wing monoplane having a fuselage 10, an empennage 11, tractor power plant and propeller unit 12, and laterally extending wings 13 of thick section springing from the forward portion of the fuselage. Preferably, the center portions of the wings, as at 14, are fixed to the fuselage, while wing tips 15 are detachably mounted thereon. The landing gear is of the split type, similar units being provided at each side of the plane of symmetry of the aircraft. A description of one such landing gear unit will be adequate for both. A laterally extending shaft 16 is fixedly mounted within the wing portion 14 toward the forward edge thereof, such shaft preferably being carried by the forward wing spar 17. On this shaft, a yoke 18 is carried for free swinging in a vertical plane, the yoke comprising spaced end faces 19 and a bearing portion 20, the axis of the bearing portion being normal to the shaft 16. A bevel gear 21 is fixedly mounted on the shaft 16 between the yoke faces 19, and an opposed bevel gear 22 is mounted for rotation of the shaft. A strut 23 is journaled in the bearing 20, and at its upper end fixedly carries a bevel gear 24 engaging with both of the gears 21 and 22. Suitable means are provided for turning the gear 22, such means as shown comprising a worm wheel 25 carried by the gear 22 and engaged by a worm 26 turnable through gearing 27 and a chain drive 28 from a suitable handle 29 located within the pilot's cockpit. The lower portion of the strut 23 carries an offset bracket 30 from the lower end of which a stub axle 31 projects toward the axis of the strut 23. On this stub axle, a wheel 32 is revolubly carried, the plane of the wheel being substantially coincident with the axis of the strut. The gears 21, 22 and 24, are so organized that when the strut 23 with its associated landing gear elements is in a substantially vertically downward position, the wheel 32 is aligned in a fore and aft plane. Upon turning of the gear 22, the gear 24 will be rotated and swung rearwardly and upwardly, by virtue of its engagement with the fixed gear 21. Thus, the strut 23 and wheel 32 will simultaneously be swung rearwardly and be turned so that when retracted, the strut and wheel lie within a suitable recess 33 in the lower wing surface, and the wheel 32 will have been turned through substantially 90° so that it lies substantially flat and flush with the lower face of the wing. A suitable fairing 34 may be rigidly carried by the strut 23 to move therewith, so that, when the strut and wheel are fully retracted, this fairing covers the forward portion of the wing recess 33. When retracted, the landing gear is wholly enclosed within the wing and thereby offers no redundant drag. Extension of the gear, which generally should be accomplished in a considerably shorter time than retraction thereof, is assisted by the weight of the landing gear, turning of the crank 29 being effective to positively move the landing gear to an extended position. It will be noted that by virtue of the worm 26 and the worm wheel 25, an irreversible organization accrues whereby inadvertent collapsing of the landing gear due to landing shocks is avoided. If desired, other suitable locking means which generally are well known in the art, may be provided to hold the landing gear in either extended or retracted position. It may also be noted that the fairing 34, when the landing gear is in its extended position, is parallel with the line of flight, thereby offering no excess drag. It will be appreciated that other means than the worm and wheel mechanism shown may be provided for turning the gear 22, such means comprising pulley and cable arrangements, an electric motor drive, or the like.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A retractable landing gear for aircraft comprising a fixed gear, a rotatable gear coaxial therewith, a yoke turnable about the gear axes, a landing strut turnable in said yoke, a gear carried by said landing gear engageable with said fixed gear and with said rotatable gear, and means for rotating said last mentioned gear for swinging said landing strut about the axis of said coaxial gears and for simultaneously turning said strut about its own axis.

2. In a retractable landing gear, a transverse shaft, a pair of facing bevel gears mounted thereon, one of the pair being fixed and the other being rotatable, a yoke journaled on said shaft and embracing said gears, a bearing having an axis normal to said shaft mounted in said yoke, a strut journaled in said bearing, and a bevel gear carried by said strut, the teeth of said last mentioned gear coacting with the teeth of said pair of gears, whereby turning of said rotatable gear simultaneously swings said yoke and strut and rotates said strut in said yoke.

3. In a retractable landing gear for aircraft, a pair of relatively rotatable spaced bevel gears, a third bevel gear engaging said pair of gears, said third gear being axially rotatable and being bodily swingable about the axis of said pair of gears, means for relatively rotating said pair of gears, and landing gear elements movable with said third gear.

CHARLES E. HATHORN.